United States Patent [19]

Lecointre et al.

[11] Patent Number: 5,099,564
[45] Date of Patent: Mar. 31, 1992

[54] METHOD OF REPAIRING A SEAL STRUCTURE IN A HYDROMECHANICAL ACTUATOR

[75] Inventors: Marc R. Lecointre, Cesson; Armand Lecru, Courtenay, both of France

[73] Assignee: Societe Nationale d'Etude et de Construction de Moteurs d'Aviation "S.N.E.C.M.A.", Paris, France

[21] Appl. No.: 684,552

[22] Filed: Apr. 12, 1991

Related U.S. Application Data

[62] Division of Ser. No. 361,501, Jun. 5, 1989, abandoned.

[30] Foreign Application Priority Data

Jun. 8, 1988 [FR] France ................. 88 07605

[51] Int. Cl.[5] ............................................. B23P 6/00
[52] U.S. Cl. ........................... 29/402.02; 29/402.03; 29/402.06; 29/402.08; 29/888.3; 29/888.021; 29/898.01
[58] Field of Search ........... 29/402.01, 402.02, 402.03, 29/402.04, 402.05, 402.06, 402.08, 402.09, 402.11, 426.1, 426.5, 888.3, 888.021, 888.041, 888.42, 889.1, 890.121, 898.01

[56] References Cited

U.S. PATENT DOCUMENTS

| | | | |
|---|---|---|---|
| 340,740 | 4/1886 | Suhr | 138/113 |
| 1,140,633 | 5/1915 | Trucano | 285/47 |
| 2,365,725 | 12/1944 | Phillips | 29/888.041 |
| 2,991,806 | 7/1961 | Rocheville et al. | 138/101 |
| 3,142,900 | 8/1964 | Merrick | 29/402.05 |
| 3,516,442 | 6/1970 | Munroe | 137/625.66 |
| 3,951,166 | 4/1976 | Whitener | 137/625.27 |
| 3,951,381 | 4/1976 | Whitener | 251/356 |
| 4,681,327 | 7/1987 | d'Agostino et al. | 277/29 |
| 4,760,864 | 8/1988 | Leclerc | 137/552 |
| 4,824,289 | 4/1989 | Glang et al. | 405/152 |

FOREIGN PATENT DOCUMENTS

0231673 8/1987 France .
0237386 9/1987 France .

Primary Examiner—P. W. Echols
Assistant Examiner—David P. Bryant
Attorney, Agent, or Firm—Bacon & Thomas

[57] ABSTRACT

A static seal structure is disclosed in which the space between a casing and a sleeve is subdivided into several chambers by the seal between an O-ring mounted on the sleeve and a seal element mounted within a groove formed in the casing. The casing may be formed with a smooth interior surface and the groove may be formed in this surface such that it has a generally rectangular cross-sectional shape opening toward the sleeve. The seal element is mounted in the groove and has a portion which extends outwardly beyond the groove toward the stationary sleeve. The O-ring mounted on the sleeve contacts the seal element to provide a fluid-tight seal between the adjacent chambers.

6 Claims, 1 Drawing Sheet

METHOD OF REPAIRING A SEAL STRUCTURE IN A HYDROMECHANICAL ACTUATOR

This application is a division of application Ser. No. 07/361,501, filed June 5, 1989, now abandoned.

BACKGROUND OF THE INVENTION

The present invention relates to a static seal structure for subdividing a space between a casing and a stationary sleeve received within the casing into a plurality of chambers. The static seal finds particular use between a casing and a sleeve utilized in a hydraulic control mechanism for gas turbine engines.

A known hydro-mechanical control for a gas turbine engine is illustrated in FIG. 1 and generally comprises a stationary casing 1, made of a lightweight alloy, within which a plunger 2 is movable along its longitudinal axis in the directions of arrows 2a. A stationary sleeve 3 is located within the casing 1 between the interior of the casing and the plunger 2. The sleeve 3 is usually made of a very hard steel to provide a long lasting bearing surface for the plunger 2 and to subdivide the space between the sleeve and the casing into a plurality of chambers. Means are provided between the sleeve and the casing to effect a fluid-tight seal between these elements so as to subdivide the space into the chambers for interconnection, in known fashion, to a hydraulic power circuit.

The casing 1 is generally cylindrical and defines a plurality of chambers 1a, 1b and 1c, each having a diameter $D_1$ (radius $R_1$) separated by sealing bosses 1d and 1e. Each of the sealing bosses define a sealing surface having a diameter $d_1$ (radius $r_1$) which is less than the diameter $D_1$ ($r_1$ less than $R_1$).

The external surface of the generally cylindrical sleeve 3 is also divided into chambers 3a, 3b, and 3c separated by sealing bosses 3d and 3e, respectively. O-rings 4 are located in grooves 5 formed in each of the sealing bosses 3d and 3e, respectively. The O-rings contact the sealing bosses 1d and 1e to provide a fluid tight seal between the respective chambers. The edges of the sealing bosses 1d and 1e may be bevelled to facilitate the insertion of the sleeve 3 with the O-rings 4 in order to prevent the tearing or marring of the sealing surfaces of the O-rings.

While the known structure has generally proven to be satisfactory in performance, fabrication defects are frequently observed in, particularly, the diameter $d_1$ of the sealing bosses. If, during fabrication, these sealing surfaces are machined to an excessive degree, diameter $d_1$ will be too large, allowing clearance between the sealing surface and the O-rings 4. This results in an imperfect fluid seal between these elements thereby rendering the device inoperative. Due to the difficulties in re-shaping such an excessively machined sealing boss, the casings thus formed were deemed to be defective and the entire casing had to be discarded.

SUMMARY OF THE INVENTION

A static seal structure is disclosed in which the space between the casing and the sleeve is subdivided into several chambers by the seal between an O-ring mounted on the sleeve and a seal element mounted within a groove formed in the casing. The casing may be formed so as to have a smooth interior surface and the groove may be formed in this surface such that it has a generally rectangular cross-sectional shape opening toward the sleeve. The seal element is mounted in the groove and has a portion which extends outwardly beyond the groove toward the stationary sleeve. The O-ring mounted on the sleeve contacts the seal element to provide a fluid-tight seal between the adjacent chambers.

The structure may also be applied to casings in which the seal bosses have been excessively machined such that they were previously thought to be rejects. In this instance, the groove is formed in the defective sealing boss and the seal element is mounted in the groove. Again, the O-ring on the stationary sleeve contacts the portion of the seal element extending beyond the groove to provide a fluid-tight seal.

The invention thus circumvents the difficulties of the prior art device by providing a structure and a method for establishing a fluid-tight seal between adjacent chambers that does not depend upon precise machining of the sealing bosses. Indeed, the invention enables the forming of the casing without such sealing bosses, relying instead solely on the seal elements mounted in the grooves formed in the casing.

DETAILED DESCRIPTION OF THE PREFERRED EMBODIMENT

Figure 1:
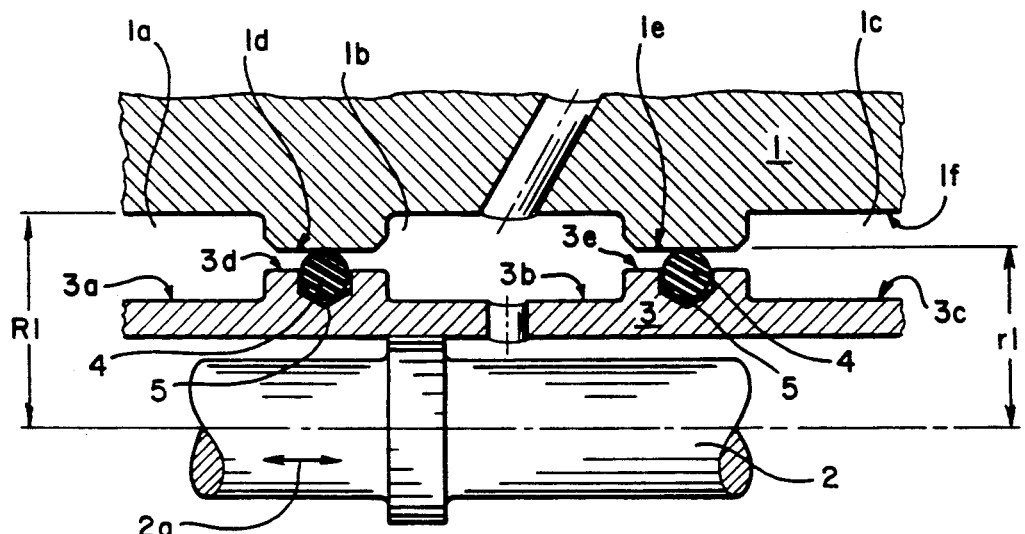
FIG. 1 is a partial, cross-sectional view of a sealing structure of a known type.
Figure 2:
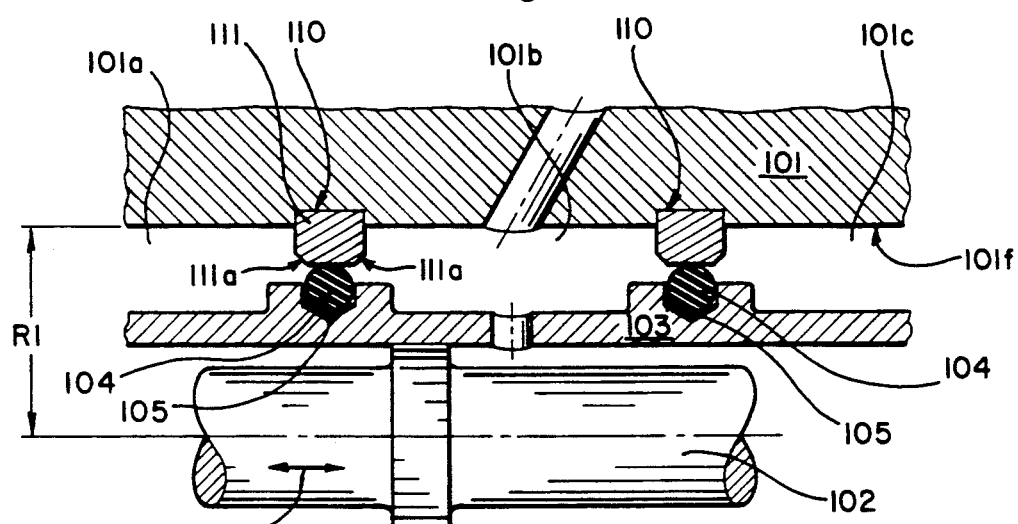
FIG. 2 is a partial, cross-sectional view illustrating the sealing structure according to the present invention.

FIG. 2 illustrates a seal structure according to the present invention and the elements which are similar to those in FIG. 1 have the same reference numerals increased by 100. In casing 101, the inside surface 101f is formed without sealing bosses. The bore 101f has a constant diameter $D_1$ (radius $R_1$). Grooves 110 are formed in the inside bore 101f having a generally rectangular cross-sectional shape and opening toward the stationary sleeve 103. The grooves 110 are located longitudinally adjacent to the O-rings 104 mounted in groove 105 defined by the sealing bosses in stationary sleeve 103. Seal elements 111, which may be made of a polytetrafluoroethylene (PTFE) material, also have a generally rectangular cross-sectional shape and are mounted within each of the grooves 110. As illustrated, a portion of each of the seal elements 111 extends outwardly beyond the groove 110 in a direction toward the sleeve 103. The edges of these exposed portions may be bevelled as at 111a. The contact between the O-ring 104 and the seal element 111 establishes a fluid-tight seal between chambers 101a, 101b and 101c, respectively.

Figure 3:
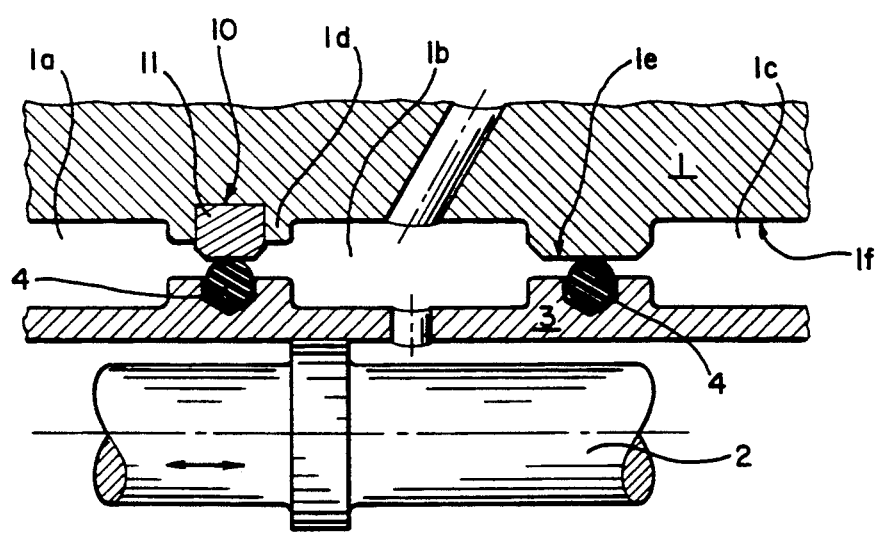
FIG. 3 is a partial, cross-sectional view illustrating the sealing structure according to the invention utilized to refurbish a defective casing.

The invention may also be used to refurbish a defective casing, as illustrated in FIG. 3. In this instance, sealing boss 1d of casing 1 has been excessively machined or has been otherwise deemed to be deficient in sealing against the corresponding O-ring 4. In the method according to the invention, the height of the sealing boss 1d (defined by the differences between radius $R_1$ and $r_1$) is reduced by additional machining and a groove 10 is formed in the sealing boss 1d. Again, groove 10 may have a generally rectangular cross-sectional shape so as to accommodate a similarly shaped seal element 11 therein. The groove 10 opens in a direction toward the sleeve 3 and seal element 11 has a portion that extends toward the sleeve 3 beyond the groove 10. Seal element 11 is sized so as to bear against the O-ring 4 and provide the requisite fluid-tight seal between chambers 1a and 1b. The edges of the portion of seal element 11 extending beyond the groove 10 may also be bevelled to facilitate the insertion of sleeve 3 without damaging O-ring 4.

The foregoing description is provided for illustrative purposes only and should not be construed as in any way limiting this invention, the scope of which is defined solely by the appended claims.

What is claimed is:

1. A method for repairing a seal structure between a casing having an inner surface defining an interior space and at least one seal boss extending from the inner surface into the interior space, and a stationary sleeve received within the interior of the casing, the sleeve having an "O"-ring seal mounted thereon, comprising the steps of:

a) removing the sleeve from the casing;
   b) forming a groove in the seal boss, the groove opening in a direction toward the interior space;
   c) inserting a seal element adapted to seat against the "O"-ring seal into the groove such that a portion of the seal element extends beyond the seal boss into the interior space; and,
   d) reinserting the sleeve into the casing such that the "O"-ring seal forms a fluid tight seal against the seal element.

2. The method according to claim 1, comprising the additional step of reducing the height of the seal boss extending into the interior space before forming the groove therein.

3. The method according to claim 1 wherein the groove is formed with a generally rectangular cross-sectional shape.

4. The method according to claim 1 wherein the seal element is formed with a generally rectangular cross-sectional shape.

5. The method according to claim 1 comprising the additional step of forming bevelled edges on the portion of the seal element extending beyond the seal boss.

6. The method according to claim 1 comprising the further step of forming the seal element from a polytetrafluoroethylene material.

* * * * *